(12) United States Patent
Ishikawa et al.

(10) Patent No.: US 8,036,424 B2
(45) Date of Patent: Oct. 11, 2011

(54) FIELD RECOGNITION APPARATUS, METHOD FOR FIELD RECOGNITION AND PROGRAM FOR THE SAME

(75) Inventors: Takahiro Ishikawa, Nagoya (JP); Takanori Fukao, Kyoto (JP)

(73) Assignees: Denso Corporation, Kariya (JP); Takanori Fukao, Kyoto (JP)

( * ) Notice: Subject to any disclaimer, the term of this patent is extended or adjusted under 35 U.S.C. 154(b) by 1200 days.

(21) Appl. No.: 11/786,152

(22) Filed: Apr. 11, 2007

(65) Prior Publication Data

US 2007/0285217 A1 Dec. 13, 2007

(30) Foreign Application Priority Data

Apr. 27, 2006 (JP) ................... 2006-124117

(51) Int. Cl.
*G06K 9/00* (2006.01)
(52) U.S. Cl. ........................................ 382/103
(58) Field of Classification Search .................. 382/103, 382/173–180
See application file for complete search history.

(56) References Cited

U.S. PATENT DOCUMENTS

| | | | | |
|---|---|---|---|---|
| 5,835,641 | A * | 11/1998 | Sotoda et al. | 382/291 |
| 6,477,260 | B1 * | 11/2002 | Shimomura | 382/106 |
| 6,535,114 | B1 | 3/2003 | Suzuki et al. | |
| 6,906,620 | B2 * | 6/2005 | Nakai et al. | 340/435 |
| 6,911,997 | B1 * | 6/2005 | Okamoto et al. | 348/148 |
| 7,346,191 | B2 * | 3/2008 | Sano | 382/104 |
| 2003/0210807 | A1 | 11/2003 | Sato et al. | |
| 2005/0232460 | A1 * | 10/2005 | Schmiz et al. | 382/103 |

FOREIGN PATENT DOCUMENTS

| | | |
|---|---|---|
| JP | 2003-009141 | 1/2003 |
| JP | 2003-191810 | 7/2003 |
| JP | 2004-56763 | 2/2004 |

OTHER PUBLICATIONS

Office Action dated Oct. 26, 2010 in corresponding Japanese Application No. 2006-124117 with English translation thereof.

* cited by examiner

*Primary Examiner* — Vu Le
*Assistant Examiner* — Alex Liew
(74) *Attorney, Agent, or Firm* — Harness, Dickey & Pierce, PLC

(57) ABSTRACT

A field recognition apparatus includes a first camera for imaging a forward field and a second camera for imaging a road surface. The second camera has a light axis tilted toward a downward direction for accurately tracking a characteristic point in consecutively captured images to calculate an optical flow and for accurately recognizing road structure information. In this manner, three dimensional information of obstacles in a field is accurately processed and detected.

44 Claims, 12 Drawing Sheets

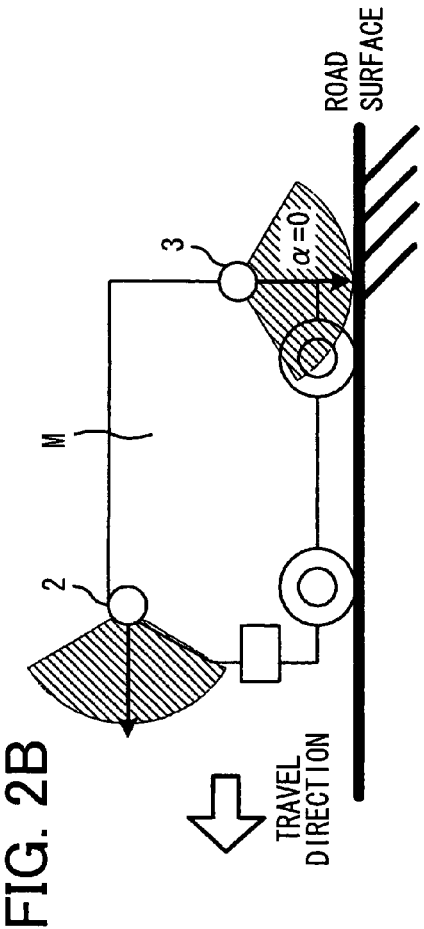
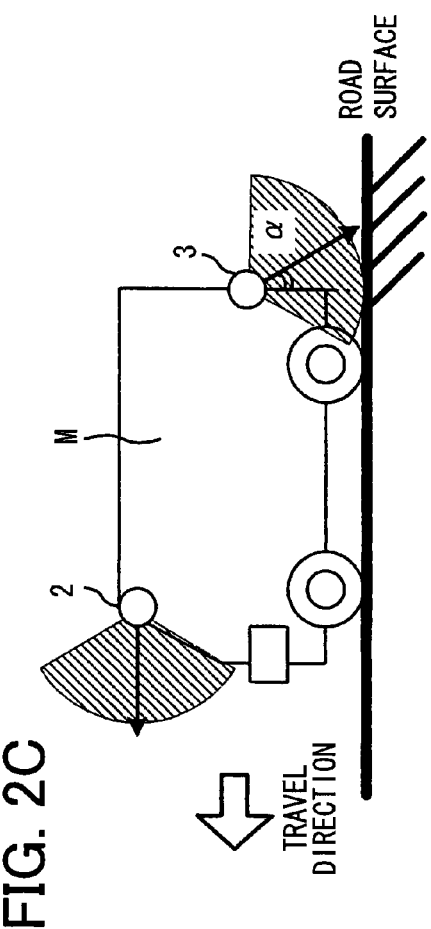
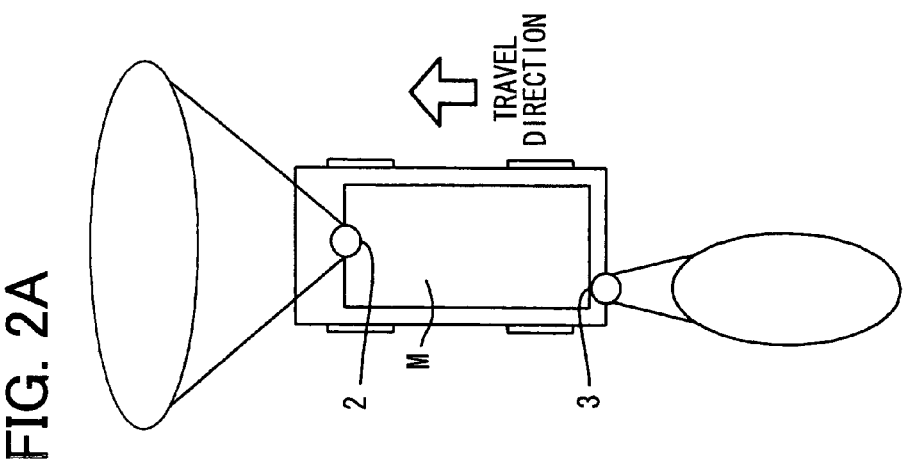
FIG. 2A
FIG. 2B
FIG. 2C

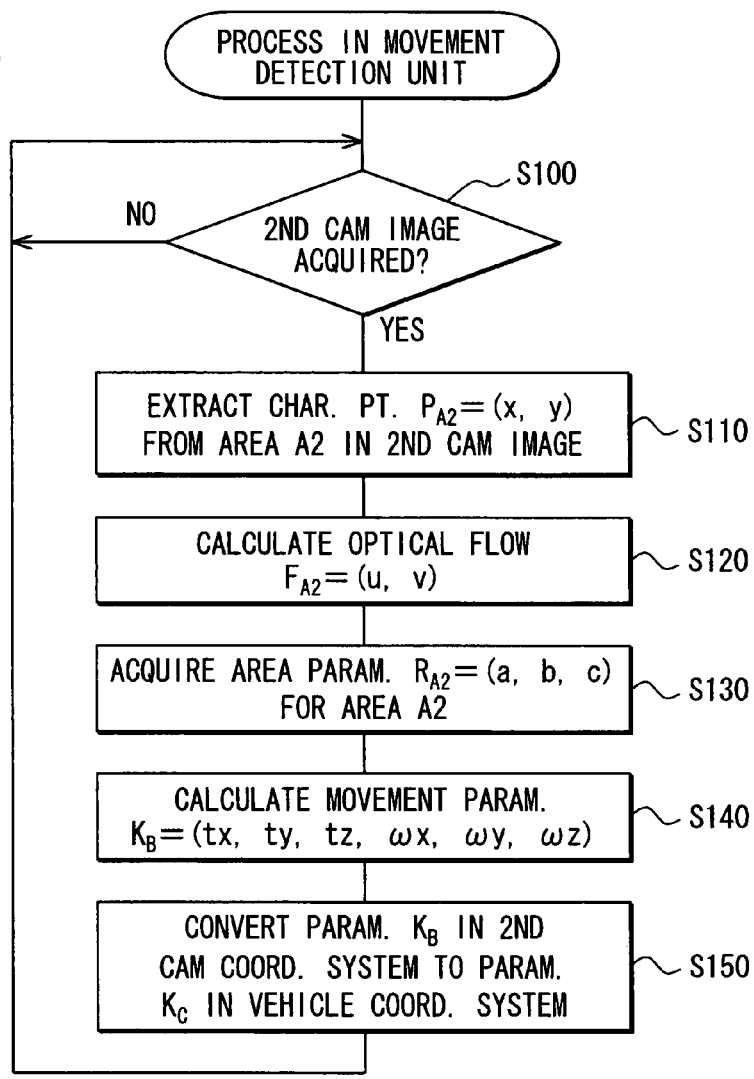
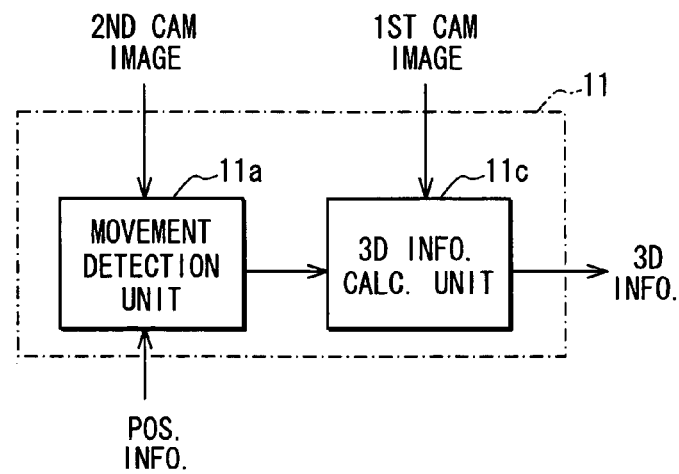

FIELD RECOGNITION APPARATUS, METHOD FOR FIELD RECOGNITION AND PROGRAM FOR THE SAME

CROSS REFERENCE TO RELATED APPLICATION

This application is based on and claims the benefit of priority of Japanese Patent Application No. 2006-124117 filed on Apr. 27, 2006, the disclosure of which is incorporated herein by reference.

FIELD OF THE INVENTION

The present invention generally relates to a field recognition apparatus, a field recognition method, and a field recognition program for use in a vehicle.

BACKGROUND INFORMATION

In recent years, an apparatus having a camera is used for detecting a movement of the apparatus itself (i.e., an apparatus movement) or a movement of a moving body that carries the apparatus based on an image captured by the camera. The image captured by the camera is further analyzed for detecting three-dimensional information of an object in the image such as a position and a shape based on the apparatus movement and a movement of the object captured in the image (Refer to, for example, U.S. Pat. No. 6,535,114).

The apparatus movement and/or the movement of the object are, in general, detected by calculating an optical flow that vectorially represents a movement of an identical characteristic point in a sequence of successive images.

The optical flow reflects, by definition, the apparatus movement when the characteristic point is standing still, and reflects a combination of the apparatus movement and the movement of the characteristic point when the characteristic point is moving.

The camera on the moving body for detecting an obstacle is positioned to have a light axis aligned substantially in a horizontal direction for capturing a wide range of a field image in front of the moving body. The moving body may practically be an automotive vehicle or the like.

The apparatus movement, or the movement of the camera in reality, is typically detected by using the characteristic point on a surface of a road, because the characteristic point on the road is generally large in the captured image and is standing still when the characteristic point is carefully chosen. That is, the apparatus movement is detected based on the optical flow derived by tracing the characteristic point in the sequence of the successive images.

However, the camera positioned in the above-described manner with its light axis substantially aligned in a horizontal direction has a large pitch angle α about a value of 90 degrees to a vertically downward direction. Therefore, the optical flow derived by tracing the characteristic point of the road has a large detection error, thereby deteriorating the accuracy of the apparatus movement.

When the light axis of the camera has the pitch angle α as shown in FIG. 12, an imaging surface G that captures a far front field in an upper half and a near front field in a lower half generates an image that includes a movement of the characteristic point on the road projected thereon in a proportionally reduced manner to a distance from the camera. That is, the same amount of the movement of the characteristic point on the road is captured as a larger movement image in the lower half of the imaging surface G when the characteristic point is positioned closer to the camera on the moving body, or is captured as a smaller movement image in the upper half of the imaging surface G when the characteristic point is positioned far off from the camera.

Therefore, the optical flow based on the movement of the characteristic point in the captured image suffers from an error that is caused by a different behavior of the characteristic point depending on a position of the characteristic point in the imaging surface G. In general, the larger the pitch angle α is, or the farther the characteristic points is from a center of the imaging surface G, the greater the error is.

The following table shows a result of a simulation that simulates a movement of a vehicle in a lateral and front-rear directions (translational movements), and in a yaw direction (a rotational movement) based on the images of the road surface captured by the camera that is positioned in the specified pitch angle α. The table compares a true value of these movements with an average of the errors in the absolute value.

| Pitch angle α [deg (rad)] | Lateral movement | | Front-rear movement | | Yaw movement | |
|---|---|---|---|---|---|---|
| | True value (m/frame) | Error (m/frame) | True value (m/frame) | Error (m/frame) | True value (deg/frame) | Error (deg/frame) |
| 5.7 (0.1) | 0.2 | 0.0 | 0.2 | 0.1 | 0.3 | 1.2 |
| 11 (0.2) | 0.2 | 0.0 | 0.2 | 0.2 | 0.3 | 1.3 |
| 17 (0.3) | 0.2 | 0.0 | 0.2 | 0.2 | 0.3 | 1.7 |
| 23 (0.4) | 0.2 | 0.0 | 0.2 | 0.2 | 0.3 | 2.6 |
| 29 (0.5) | 0.2 | 0.0 | 0.2 | 0.2 | 0.3 | 4.3 |

The height of the camera from the road surface is 1.5 meter (the height of the camera corresponds to a map lamp side position of a one box type vehicle where the camera is installed), and the pitch angle α of the camera to the vertically downward direction is defined in five levels of 0.1, 0.2, 0.3, 0.4, 0.5 radians with no roll angle and no yaw angle.

Resolution of the camera is 320 pixels in width by 240 pixels in height, and a frame rate is 0.2 ms/frame.

The road surface is evenly flat with a rectangular paint mark of 2 meters in width by 5 meters in length. The vehicle is assumed to be turning at a corner of the right angle toward left at a speed of 22 km in ten seconds, which simulates a slow left turn at an intersection. The image is processed by a movement detector 11a that is described later in the embodiment section of the disclosure.

In the processing of the image, the four corners of the rectangular paint mark are specified as the characteristic points, and the translational movement of the vehicle has components only in the lateral directions (i.e., x axis in FIG. 3B), the front-rear directions (i.e., y axis in FIG. 3B). Further, the rotational movement of the vehicle has components only in the yaw direction (i.e., the rotation around z axis in FIG. 3B) with no change in the components in the pitch direction and the roll direction (i.e., the rotation around x and y axes in FIG. 3B).

As shown in the above table, the error of the rotational movement in the yaw direction increases when the pitch angle α of the camera is increased. Therefore, the camera having a greater pitch angle cannot accurately detect the movement of the apparatus and the vehicle.

On the other hand, when the camera has a smaller pitch angle α (i.e., the light axis of the camera is aligned closer to the vertically downward direction) for increasing detection accuracy of the apparatus movement, the camera captures a smaller range of the front field, thereby decreasing an obstacle detection capability. That is, the obstacle detection accuracy by the camera and the apparatus movement detection accuracy by the camera are in a trade-off relationship with each other. Therefore, the apparatus described above cannot improve the apparatus movement detection accuracy and the obstacle detection accuracy at the same time in a detection operation of the three-dimensional information of an object in the field.

Further, when the vehicle is moving forward, the characteristic point on a still object in the three-dimensional field comes closer toward the vehicle from a far side, and the optical flow of the characteristic point in the camera captured image runs downward in the image from an upper side of the image toward a lower side. Therefore, when the optical flow of the characteristic point on the road is calculated by tracing the characteristic point in the image, the characteristic point is traced in a direction that flows from an image data scarce side to an image data abundant side as shown in FIG. 13.

Therefore, in this case, an increased number of the characteristic points may possibly be detected on the lower side of the image because the image data are abundant on the lower side in comparison to the upper side. However, the characteristic points on the lower side immediately disappears from the image, thereby making it impossible to trace them for detecting the optical flow.

SUMMARY OF THE INVENTION

In view of the above-described and other problems, the present disclosure provides a field recognition apparatus that detects the movement of the camera and the object in the field based on the calculation of an optical flow in a reliable manner for the improvement of the detection accuracy.

In one aspect of the present disclosure, the field recognition apparatus for use in a movable body includes a first imaging unit disposed on the movable body for imaging a field in a proximity of the movable body, a second imaging unit disposed on the movable body for imaging a road surface that is traveled by the movable body with its light axis pointing downward in comparison to the light axis of the first imaging unit, a movement detection unit for detecting an optical flow of a characteristic point on the road surface based on an image of the road surface derived from the second imaging unit, and an obstacle detection unit for calculating three-dimensional data of a position and a shape of an obstacle based on a movement parameter derived from the movement detection unit and an image derived from the first imaging unit.

In the movement detection unit, the optical flow of the characteristic point is used to determine a movement parameter that specifies the movement of the movable body, and the movement parameter is used in the obstacle detection unit for the calculation of the three-dimensional data of the obstacle. In this manner, the optical flow derived from the characteristic point in the captured image can be accurately calculated because of the light axis direction of the second imaging unit that is tilted downward in comparison to the first imaging unit for reducing the movement of the characteristic points in the captured image.

Further, the captured image derived from the first imaging unit has a wider range of recognition field in comparison to the image from the second imaging unit, thereby enabling a detection of an increased number of obstacle in the field.

Therefore, the field recognition apparatus of the present disclosure is able to detect the obstacle in the field accurately as a three-dimensional object based on the movement parameter derived from the captured image.

In another aspect of the present disclosure, the captured image is divided into plural areas for the improvement of object detection accuracy. That is, the detection accuracy can be improved either by increasing the accuracy of the movement parameter or by calculating the movement of the first imaging unit as a correction for the movement parameter.

In yet another aspect of the present disclosure, the first imaging unit has its light axis aligned in the horizontal direction and a landscape shape imaging area for the improvement of an object detection range.

In still yet another aspect of the present disclosure, the second imaging unit has its light axis aligned in a vertically downward direction or in a tilted direction toward a back of a vehicle for the improvement of an object detection accuracy due to an increased tracking length of the characteristic point along the traveling direction of the vehicle.

In still yet another aspect of the present disclosure, the direction of the second imaging unit is controlled according to the traveling speed of the vehicle. In this manner, the characteristic point in the image can be tracked with an increased accuracy due to an optimized angle of the imaging unit.

In still yet another aspect of the present disclosure, the second imaging unit has a portrait shape imaging area and is positioned on either side or both sides of the vehicle for improved detection accuracy of the characteristic points on the road surface in the right/left side traffic. In addition, the second imaging unit may be laterally outwardly tilted for further improvement of the detection accuracy by avoiding the subject vehicle to be captured in the image. Furthermore, the second imaging unit may be used as a back monitor camera for reducing the dead angle of the driver.

In still yet another aspect of the present disclosure, the second imaging unit may be positioned on a bottom surface of the vehicle. In addition, the second imaging unit may be positioned in a front half of the vehicle. In this manner, the image captured derived from the second imaging unit can be used for detecting the object in an improved accuracy by not having the edge of the vehicle shadow in the captured image.

In still yet another aspect of the present disclosure, the second imaging unit may have a lighting unit for the ease of the detection of the characteristic point.

In still yet another aspect of the present disclosure, the first and the second imaging units may be a monochrome camera, a color camera or an infrared camera. Further, a vision chip or the like may be used for edge enhancement of the captured image.

In still yet another aspect of the present disclosure, the field recognition apparatus of the present disclosure can be described as a method for field recognition or as a computer program for field recognition.

BRIEF DESCRIPTION OF THE DRAWINGS

Other objects, features and advantages of the present invention will become more apparent from the following detailed description made with reference to the accompanying drawings, in which:

FIGS. 2A, 2B and 2C show illustrations of camera positions and camera controls in the first embodiment;

FIG. 4 shows a flowchart of a process in the movement detection unit 11*a*;

FIG. 7 shows a block diagram of a field recognition unit in a second embodiment of the present disclosure;

DETAILED DESCRIPTION

Embodiments of the present invention are described with reference to the drawings. Like parts have like numbers in each of the embodiments.

Figure 1A:
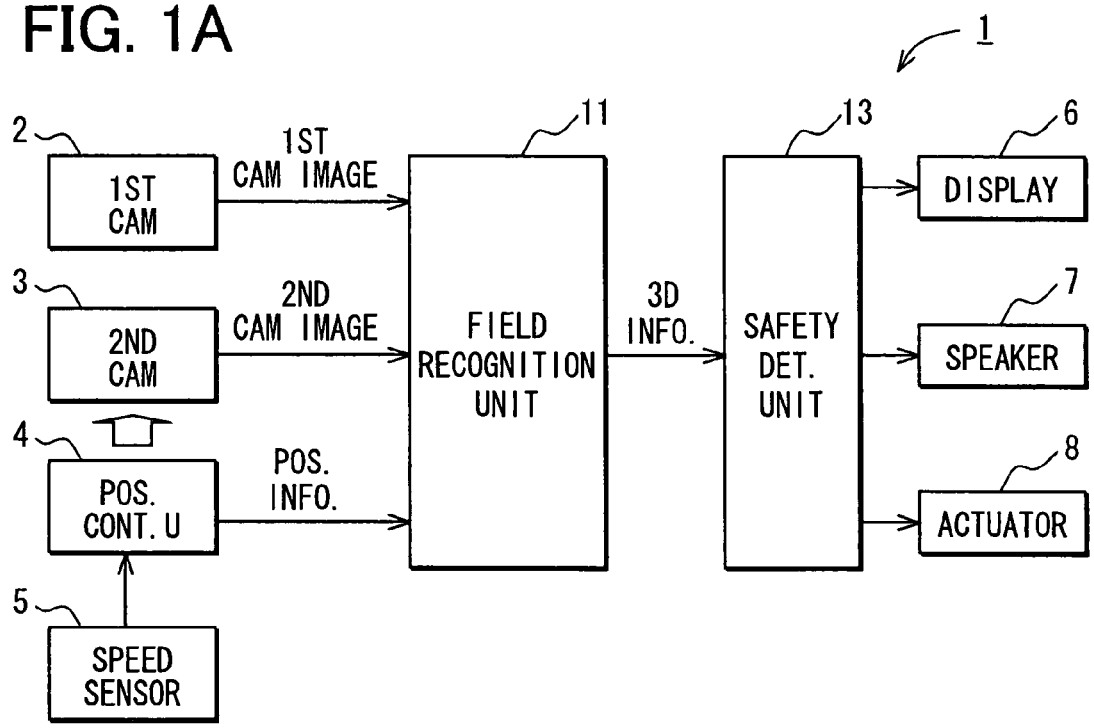
FIGS. 1A and 1B show block diagrams of a field recognition apparatus in a first embodiment of the present disclosure.

FIG. 1A shows a block diagram of a field recognition apparatus 1 in a first embodiment of the present invention.

As FIG. 1A shows, the field recognition apparatus 1 includes a first imaging unit 2, a second imaging unit 3, a speed sensor 5, a position control unit 4, a display unit 6, a speaker 7, various actuators 8, a field recognition unit 11, and a safety determination unit 13.

The first imaging unit 2 captures an image of a field on a road and surrounding conditions in front of a subject vehicle, and the second imaging unit 3 mainly captures a road surface at the back of the subject vehicle. The speed sensor 5 detects a speed of the subject vehicle, and the position control unit 4 controls a position of the second imaging unit 3. The display unit 6 and the speaker 7 provides various information visually and vocally for a driver and/or other occupants of the subject vehicle. The various actuators 8 provide various vehicle controls such as an engine control, a brake control, a transmission control, a steering control and the like. The field recognition unit 11 acquires images from the first imaging unit 2 and the second imaging unit 3, and also acquires position information from the position control unit 4 for generating three-dimensional information of a position and/or a shape of an obstacle on and around the road such as a vehicle, a road side object and the like. The safety determination unit 13 determines safety hazard such as a departure of the subject vehicle from the road, existence of the obstacle, or the like, and provides warning and/or notice by the display unit 6 and the speaker 7 based on the three-dimensional information derived from the field recognition unit 11. In addition, the safety determination unit 13 controls the various actuators 8 for providing a safety hazard avoidance operation or the like.

The field recognition unit 11 and the safety determination unit 13 are respectively constructed by microcomputers having a CPU, a ROM, a RAM and other components. The first imaging unit 2 and the second imaging unit 3 are respectively constructed by CCD cameras (having a field angle of 45 degrees). Both of the imaging units generates a monochrome image having a pixel value that represents luminous intensity. The first imaging unit 2 and the second imaging unit 3 generate rectangular images of respectively different sizes in terms of the number of pixels in horizontal and vertical directions.

FIG. 2A shows an illustration of an installation condition of the first imaging unit 2 and the second imaging unit 3, and FIGS. 2B and 2C show illustrations of position controls of the imaging unit by the position control unit 4.

As FIGS. 2A to 2C show, the first imaging unit 2 is installed in a proximity of a map lamp on a windshield of a subject vehicle M, and has a light axis aligned to a front direction (a traveling direction) of the vehicle M that is at a pitch angle α of 90 degrees relative to a vertically downward direction. The image captured by the first imaging unit 2 is configured to have a shape of a landscape rectangle that has shorter vertical sides aligned with the traveling direction of the vehicle M.

The second imaging unit 3 is installed on a rear left side of the vehicle M at a height of 0.5 meters. A light angle of the second imaging unit 3 can be changed in a range of the pitch angle α between 0 degree (the vertically downward direction as shown in FIG. 2B) and 30 degrees (as shown in FIG. 2C). The image captured by the second imaging unit 3 is configured to have a shape of a portrait rectangle that has longer vertical sides aligned with the traveling direction of the vehicle M.

The position control unit 4 controls the pitch angle α according to the speed of the vehicle M so that the images successively captured by the second imaging unit 3 always have an identical characteristic point on a road surface. The images captured by the imaging units may also mentioned as frames in the following description.

The height of the installation position and a position control range (an inclination angle of the light axis) of the second imaging unit 3 are determined based on a frame rate of the second imaging unit 3. That is, the pitch angle α equals to 0 degree when the speed of the vehicle M is less than 40 km/h, and the pitch angle α equals to 30 degrees when the speed of the vehicle M is equal to or greater than 40 km/h.

Figure 1B:
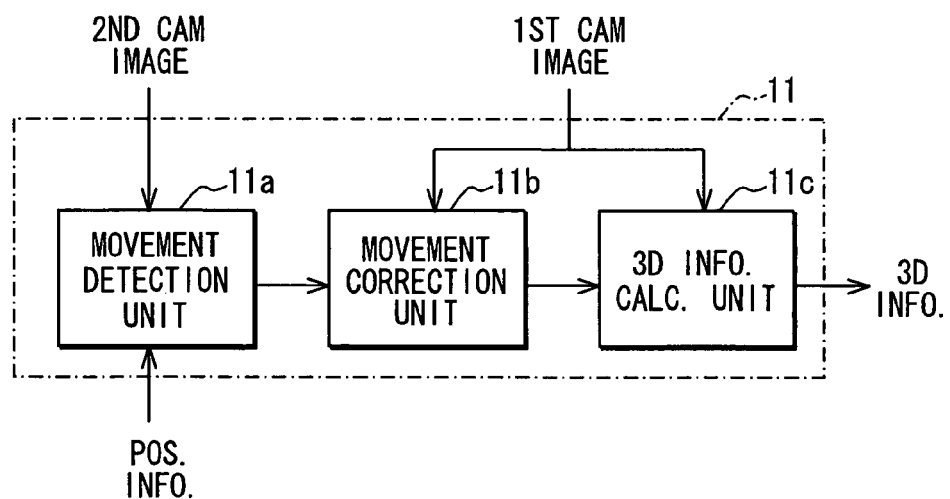

The field recognition unit 11 includes, as shown in FIG. 1B, a movement detection unit 11a that generates a movement parameter for representing a movement of the vehicle M based on the captured image derived from the second imaging unit 3 (i.e., a second camera image in the following description) and position information derived from the position control unit 4, a movement correction unit 11b that corrects the movement parameter to reflects a movement of the first imaging unit 2 based on the movement parameter derived from the movement detection unit 11a an the captured image derived from the first imaging unit 2 (i.e., a first camera image in the following description), and a three-dimensional information calculation unit 11c that generates three-dimensional information of the obstacle in the first camera image based on the movement parameter corrected by the movement correction unit 11b and the first camera image. The functions of these units 11a to 11c are implemented as processes in the CPU in the field recognition unit 11.

The details of the processes that correspond to respective units 11a to 11c in the field recognition unit 11 are described in the following.

Figure 3A:
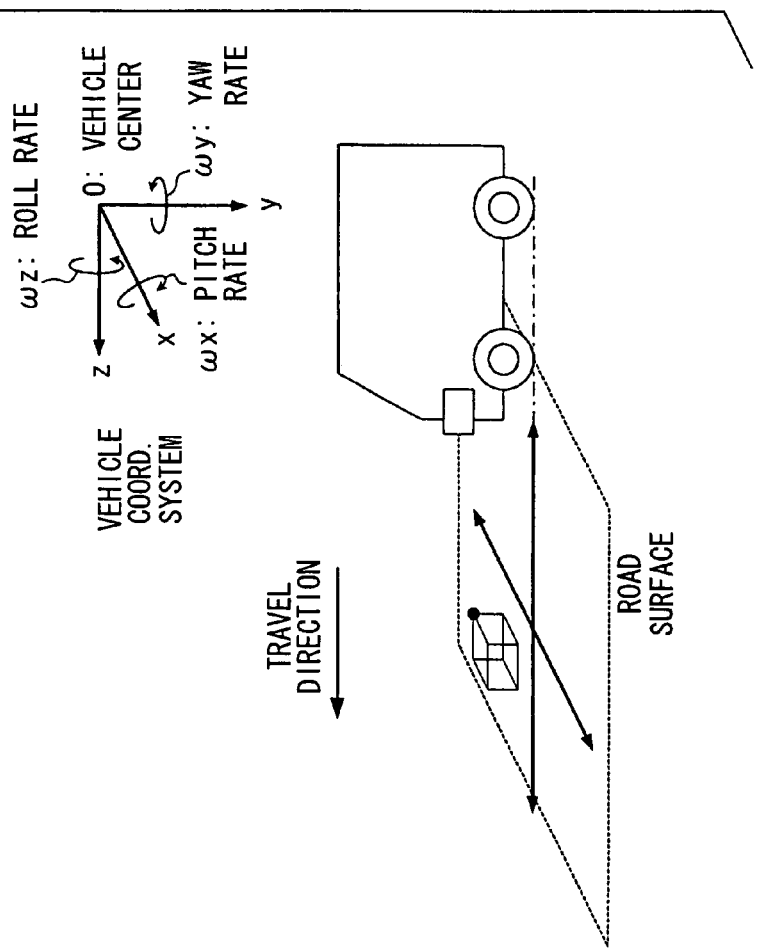
FIGS. 3A and 3B show illustrations of a coordinate system used in the first embodiment.
Figure 3B:
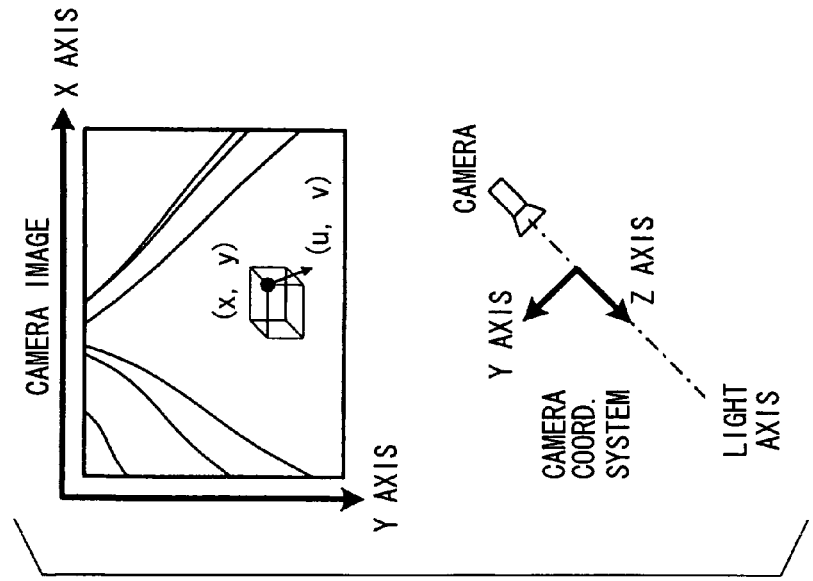

The coordinate systems in the following description are defined in the following manner. That is, a first camera coordinate system that uses the installation position of the first imaging unit 2 as a base position and a second camera coordinate system that uses the installation position of the second imaging unit 3 as a base position determine, as shown in FIG. 3A, the lateral direction of the camera images as x axes, the vertical direction of the camera images as y axes, and the light axes of the cameras as z axes. Further, as shown in FIG. 3B, a vehicle coordinate system that uses a center point of the vehicle determines the width direction of the vehicle as x axis, the traveling direction of the vehicle as y axis, and the height direction of the vehicle as z axis.

Further, the speed in the x axis direction is represented as a lateral speed tx, the speed in the y axis direction is represented as a travel speed ty, and the speed in the z axis direction is represented as a vertical speed tx. In addition, an angular speed around the x axis is represented as a pitch rate ωx, an angular speed around the y axis is represented as a roll rate ωy, and an angular speed around the z axis is represented as a yaw rate ωz. Thus, a movement parameter K is defined as a vector having the above described figures as its components, that is K=(tx, ty, tz, ωx, ωy, ωz).

The ROM of the field recognition unit 11 stores the following information. That is, in the ROM of the field recognition unit 11, a position of a road area A1 that always captures the road in the first camera image is represented as road area information $J_{A1}$, and a position of a road area A2 that always captures the road in the second camera image is represented as road area information $J_{A2}$. In addition, the position and the shape of the road area A2 (the road surface on the assumption that the road is planar) in the second camera coordinate system is represented as an area parameter $R_{A2}$=(a, b, c) in the ROM.

The area parameter R is defined by using the following equations.

$$ax+bx+c=1/Z \qquad \text{[Equation 1]}$$

$$X=xZ/f \; Y=yZ/f \; Z=1/(ax+bx+c) \qquad \text{[Equation 2]}$$

The equation 1 represents a relationship between a point (x, y) and a depth (i.e., a distance in the direction of the light axis) when the point (x, y) in the camera image exists on a certain plane in the three dimensional space in the camera coordinate system. The equation 2 represents a relationship between the point (x, y) and a three-dimensional position (X, Y, Z) in the corresponding camera coordinate system in association with a focal distance f of the camera when the equation 1 is fulfilled. In this case, a relationship between the area parameter (a, b, c) of a planar area and a normal vector (A, B, C) of the planar area is defined by an equation 3 in the following.

$$(A, B, C)=(fa, fb, c) \qquad \text{[Equation 2]}$$

The road area information $J_{A2}$ regarding the road area A2 and the area parameter $R_{A2}$ are stored in a table format with indexes of the position derived from the position control unit 4 because the position of the second imaging unit 3 changes depending on the vehicle speed.

Figure 5:
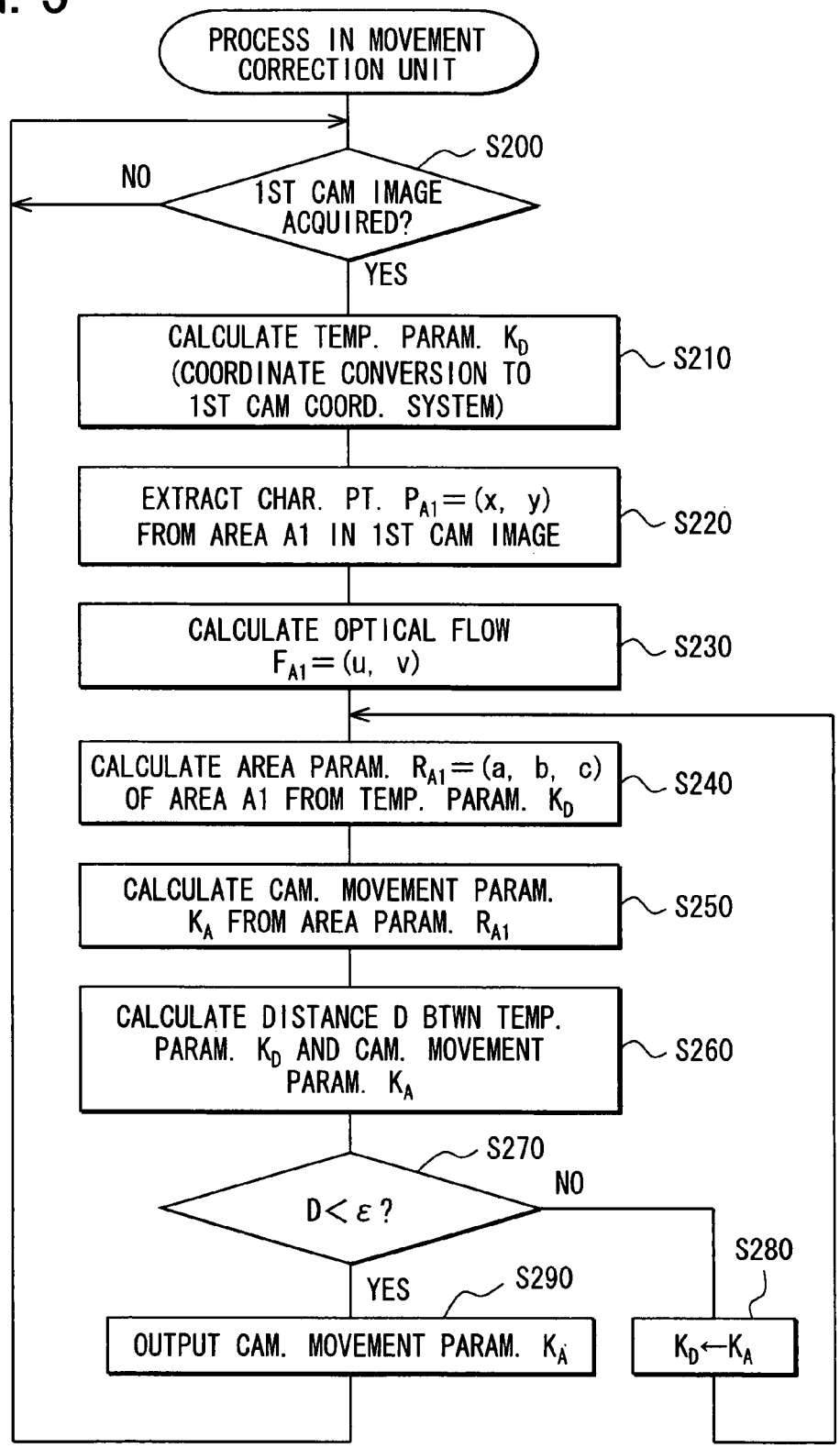
FIG. 5 shows a flowchart of a process in the movement correction unit 11b.
Figure 6:
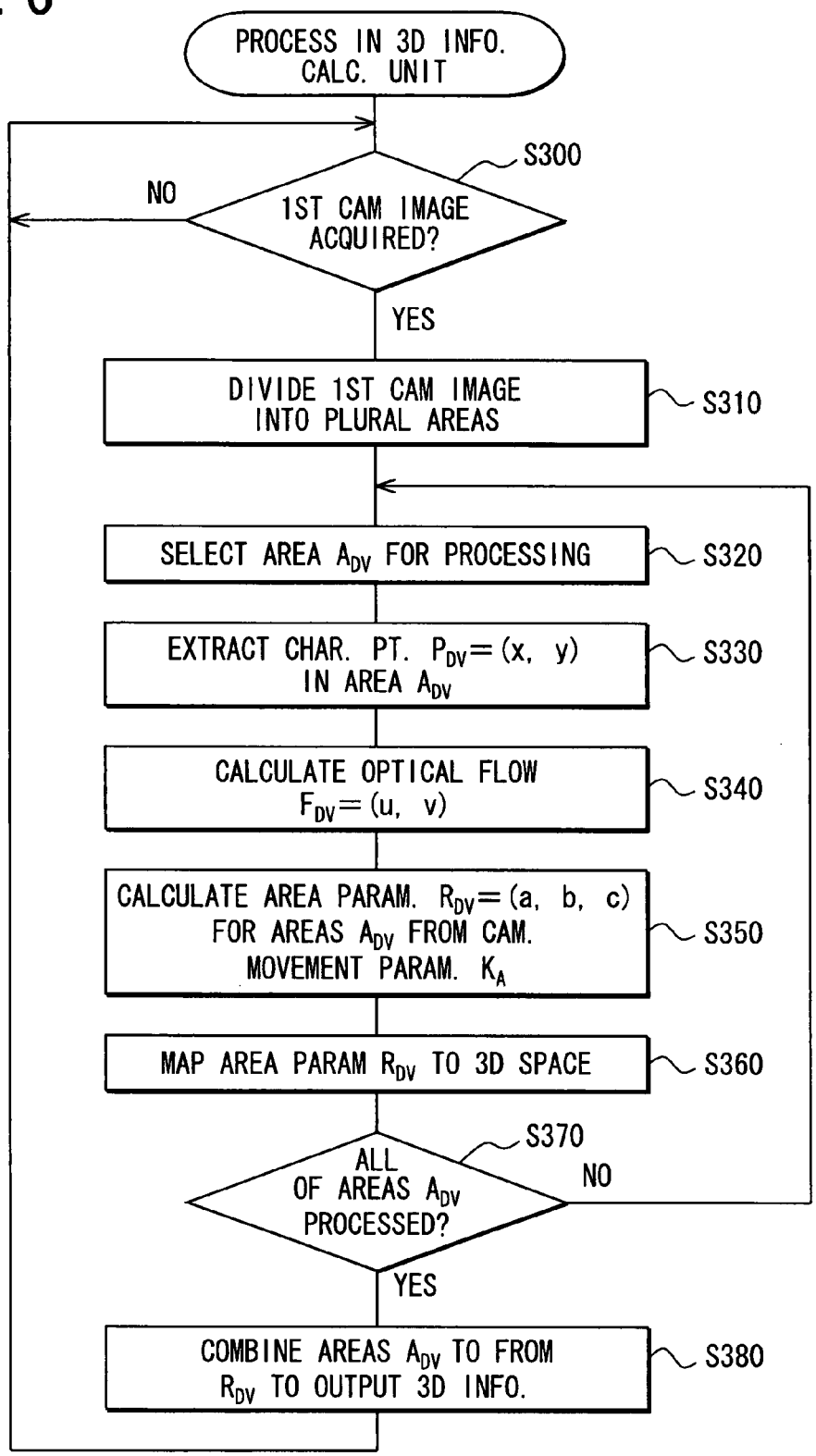
FIG. 6 shows a flowchart of a process in the three-dimensional information calculation unit 11c.

FIG. 4 shows a flowchart of a process in the movement detection unit 11a. FIG. 5 shows a flowchart of a process in the movement correction unit 11b. FIG. 6 shows a flowchart of a process in the three-dimensional information calculation unit 11c.

The process in the movement detection unit 11a starts with an acquisition of the second camera image in step S100 as shown in FIG. 4.

In step S100, the process repeats itself until it acquires the second camera image from the second imaging unit 3 (step S100:NO). The process proceeds to step S110 when the second camera image is acquired (step S100:YES).

In step S110, the process acquires the road area information $J_{A2}$ based on the position information from the position control unit 4, and extracts $N_{A2}$ pieces (i.e., at least three pieces) of characteristic point $P_{A2}$=(x, y) from the road area A2 in the second camera image that is determined by the road area information $J_{A2}$. In this case, the process extracts edges of various road surface markings (e.g., road sign, line marker and the like), cats eyes, border lines between road side objects (e.g., curbstones, soundproof walls, roadside trees or the like) and the road surface and similar figures as the characteristic point $P_{A2}$. That is, the process chooses the point where the change of the pixel value takes a large value as the characteristic point $P_{A2}$.

In step S120, the process calculates an optical flow $F_{A2}$=(u, v) for each of the characteristic points $P_{A2}$ based on the characteristic points $P_{A2}$ extracted in step S110 and detection results in preceding processes.

In step S130, the process acquires the area parameter $R_{A2}$=(a, b, c) for the road area A2 based on the position information.

In step S140, the process calculates the movement parameter $K_B$ that represents the movement of the second imaging unit 3 in the second camera coordinate system based on the area parameter $R_{A2}$ and the optical flow $F_{A2}$ calculated in step S120.

More practically, the optical flow (u, v) is defined in the following equations.

$$u=(f\omega_y+cft_x)-(ct_z+aft_x)x+(bft_x-\omega_z)y+(\omega_y/f-at_z)x^2-(\omega_x/f+bt_z)xy \qquad \text{[Equation 4]}$$

$$v=-(f\omega_x+cft_y)+(\omega_z+aft_y)x+(-ct_z+bft_y)y+(\omega_y/f-at_z)xy-(\omega_x/f+bt_z)y^2 \qquad \text{[Equation 5]}$$

In the above equations, the set of vriables (x, y) represents the characteristic point, the set of variables (a, b, c) represents the area parameter, the set of variables (tx, ty, tz, ωx, ωy, ωz) represents the movement parameter, and the variable f represents the focal distance of the imaging unit.

Therefore, at least three characteristic points (x, y) and at least three optical flows (u, v) yield at least six simultaneous equations for each of the six components of the movement parameter (tx, ty, tz, ωx, ωy, ωz). Thus, the simultaneous equations are solved by using a simplex method or other well-known optimization method for determining each of the six components of the movement parameter.

The optical flow model described above is explained in detail in, for example, "A robust method for computing vehicle ego-motion published in IEEE Intelligent Vehicles Symposium (IV2000), October 2000, Dearborn, Mich. by G. Stein, O. Mano and A. Shashua.

In step S150, the process converts the coordinate system from the second camera coordinate system to the vehicle coordinate system for having a movement parameter $K_C$ because the movement parameter $K_B$ described above is represented by using the second camera coordinate system. The process returns to step S100 after coordinate system conversion.

In this manner, the movement detection unit 11a calculates the movement parameter $K_C$ that represents the movement of the vehicle M by applying approximation for the second camera image based on the assumption that the movement of the second imaging unit 3 on the vehicle M and the movement of the vehicle M itself is close enough.

Then, the process in the movement correction unit 11b starts with an acquisition of the first camera image in step S200 as shown in FIG. 5.

In step S200, the process repeats itself until it acquires the first camera image from the first imaging unit 2 (step S200: NO). The process proceeds to step S210 when the first camera image is acquired (step S200:YES).

In step S210, the process converts the vehicle coordinate system to the first camera coordinate system for representing the movement parameter $K_C$ derived from the movement detection unit 11a as a temporal movement parameter $K_D$ in the first camera coordinate system.

In step S220, the process extracts $N_{A1}$ pieces (i.e., at least three pieces) of characteristic point $P_{A1}=(x, y)$ from the road area A1 in the first camera image that is determined by the road area information $J_{A1}$.

In step S230, the process calculates an optical flow $F_{A1}=(u, v)$ for each of the characteristic points $P_{A1}$ based on the characteristic points $P_{A1}$ extracted in step S220 and detection results in the preceding processes.

In step S240, the process calculates the area parameter $R_{A1}=(a, b, c)$ of the road area A1 based on the temporal movement parameter $K_D$, the characteristic point $P_{A1}$ derived in step S220, and the optical flow $F_{A1}$ calculated in step S230.

In step S250, the process calculates the movement parameter $K_A$ that represents the movement of the first imaging unit 2 in the first camera coordinate system based on the area parameter $R_{A1}$ and the optical flow $F_{A1}$ calculated in step S230.

In steps S240 and S250, the process calculates the area parameter $R_{A1}$ and the optical flow $F_{A1}$ by solving the simultaneous equations derived from equations 4, 5 with the simplex method or other well-known optimization method in the same manner as in step S140.

In step S260, the process calculates a distance D between the temporal movement parameter $K_D$ calculated in step S210 and the movement parameter $K_A$ calculated in step S250.

In step S270, the process determines whether the distance D is smaller than a predetermined threshold ϵ. The process proceeds to step S280 for updating the value of the movement parameter $K_D$ by the value of the movement parameter $K_A$ calculated in step S250 when the distance D is equal to or greater than the threshold ϵ (step S270:NO), and repeats steps S240 to S270. The process proceeds to step S290 for outputting the movement parameter $K_A$ to the three-dimensional information calculation unit 11c when the distance D is smaller than the threshold ϵ (step S270:YES), and returns to step S200.

In this manner, the movement correction unit 11b repeats the process until the value of the temporal movement parameter $K_D$ derived from the second camera image and the value of the movement parameter $K_A$ derived from the first camera image agree. As a result, the process calculates the movement parameter $K_A$ that reflects the movement of the first imaging unit 2 in the first camera coordinate system in a more accurate manner.

Then, the process in the three-dimensional information calculation unit 11c starts with an acquisition of the first camera image in step S300 as shown in FIG. 6.

In step S300, the process repeats itself until it acquires the first camera image from the first imaging unit 2 (step S300: NO). The process proceeds to step S310 when the first camera image is acquired (step S300:YES).

In step S310, the process divides the first camera image into plural areas so that each of the plural areas becomes a single planar polygon such as a rectangle or the like.

In step S320, the process selects one of the plural areas as area $A_{DV}$ for processing.

In step S330, the process extracts $N_{DV}$ pieces (at least three pieces) of characteristic points $P_{DV}=(x, y)$.

In step S340, the process calculates an optical flow $F_{DV}=(u, v)$ for each of the characteristic points $P_{DV}$.

In step S350, the process calculates an area parameter $R_{DV}=(a, b, c)$ for each of the areas $A_{DV}$ based on the movement parameter $K_A$ derived from the movement correction unit 11b, the characteristic points $P_{DV}$, and the optical flow $F_{DV}$ calculated in step S340.

In step S360, the process maps each of the areas $A_{DV}$ to a three-dimensional space represented by using the first camera coordinate system based on the area parameter $R_{DV}$.

In step S370, the process determines whether all of the divisional areas $A_{DV}$ are processed by steps S320 to S360. The process returns to step S320 when un-processed area is found among the areas $A_{DV}$ (step S370:YES). The process proceeds to step S380 when all of the areas $A_{DV}$ have been processed (step S370:NO).

In step S380, the process combines the areas $A_{DV}$ mapped in the three-dimensional space as being detected as an obstacle, and calculates the three-dimensional information of the obstacle (i.e., the position and the shape) before returning to step S300.

The effectiveness of the field recognition apparatus 1 is summarized as follows. That is, the field recognition apparatus 1 has the first imaging unit 2 and the second imaging unit 3 respectively imaging a landscape shape field image with its light axis aligned in the horizontal direction for increasing a coverage in the lateral direction of the vehicle and a portrait shape field image with its light axis tilted to a downward direction for increasing a coverage in the traveling direction of the vehicle. Tilt angle of the light axis of the second imaging unit 3 in the traveling direction of the vehicle can be changed according to the vehicle speed for further facilitating the characteristic points tracking.

Therefore, the optical flow $F_{A2}$ and related movement parameters of $K_B$, $K_C$, $K_A$ can accurately be calculated based on the tracking of the characteristic points $P_{A2}$ in the road area A2, and thereby enabling an accurate detection of the three-dimensional information of the obstacle for a wide range of recognition field.

Further, the second imaging unit 3 of the field recognition apparatus 1 is disposed to image a back field of the vehicle, and captures the image that flows from the information abundant side to the information scarce side when the vehicle is traveling forward. Therefore, the optical flow $F_{A2}$ calculated in the image can effectively utilize the information in the image.

A second embodiment of the present disclosure is described in the following. Difference between the first and the second embodiment exists in the structure of the field recognition unit 11. The details of the difference is as follows.

FIG. 7 shows a block diagram of the field recognition unit 11 in the second embodiment of the present disclosure.

As shown in FIG. 7, the field recognition unit 11 in the second embodiment includes only the movement detection unit 11a and the three-dimensional information calculation unit 11c. That is, the movement correction unit 11b does not exist.

The movement detection unit 11a converts the movement parameter $K_B$ in the second camera coordinate system to the movement parameter $K_A$ in the first camera coordinate system in step S150 (refer to FIG. 4). In addition, the three-dimensional information calculation unit 1c conducts processing based on the movement parameter $K_A$ calculated in the movement detection unit 11a. Other processes are conducted in the same manner as the processes in the first embodiment.

Therefore, the field recognition apparatus 1 in the present embodiment reduces a processing load due to an omission of the movement correction unit 11b.

Although the present invention has been fully described in connection with the preferred embodiment thereof with reference to the accompanying drawings, it is to be noted that various changes and modifications will become apparent to those skilled in the art.

Figure 8A:
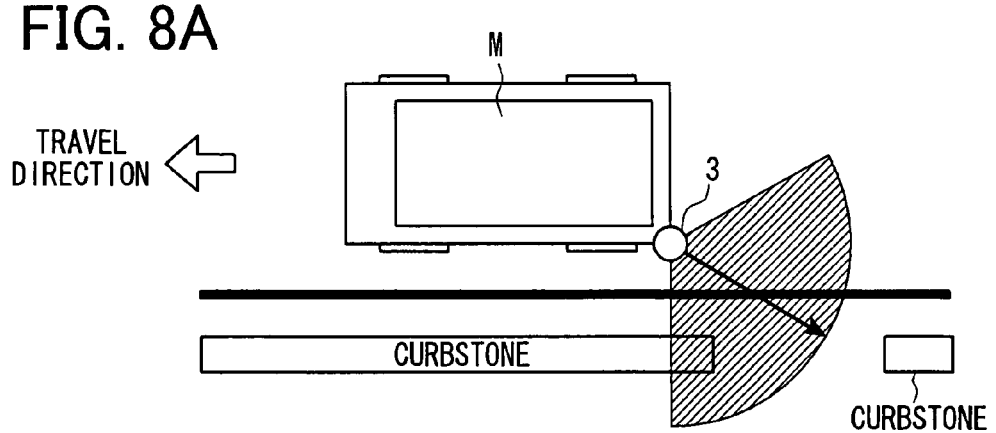
FIGS. 8A, 8B and 8C show illustrations of camera positions in modifications of the embodiments.

For example, the second imaging unit 3 is disposed on a rear left side of the vehicle with its light axis tilted downward toward the back of the vehicle or toward a vertically downward direction. However, the light axis may be directed obliquely toward a rear left of the vehicle as shown in FIG. 8A.

In this manner, the road marking on the left edge of the lane, road side objects such as the curbstones of the left of the road in the left side traffic, the center divider of the right side traffic or the like can be appropriately be extracted as the characteristic points $P_{A2}$ from the second camera image.

Figure 8B:
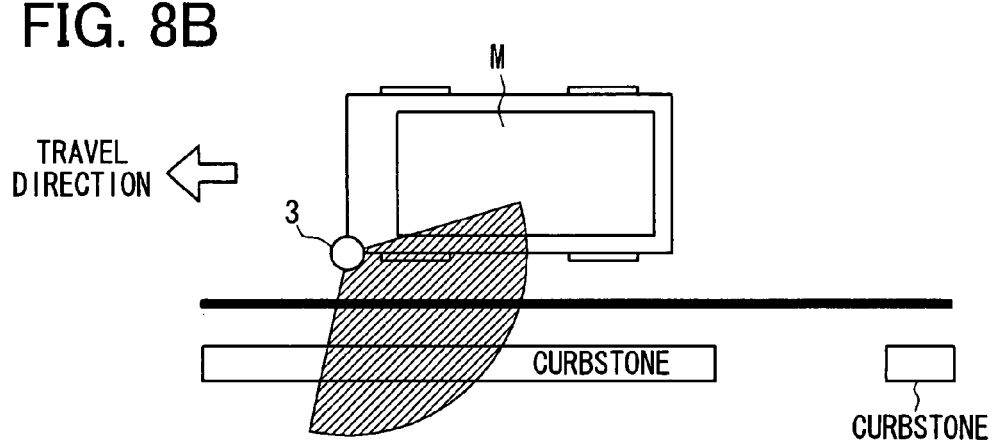
Figure 8C:
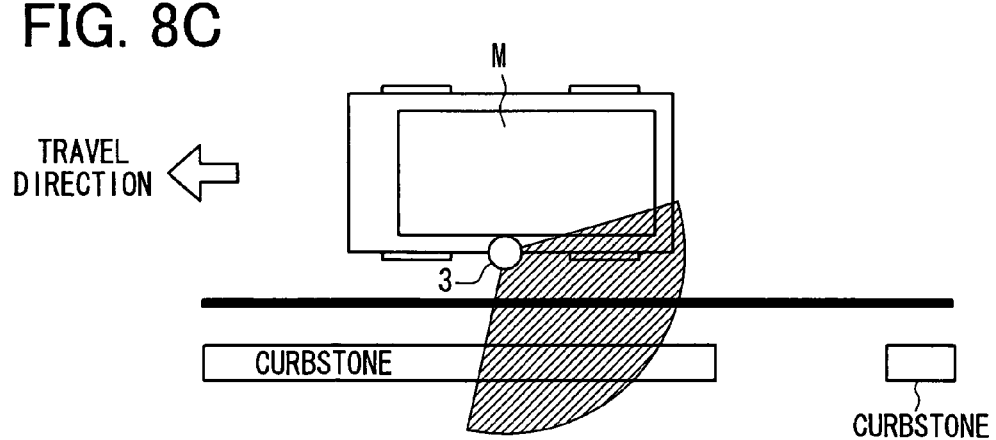

Further, the second imaging unit 3 may be positioned at a front of the vehicle M as shown in FIG. 8B, or at or around a center of the vehicle M as shown in FIG. 8C.

Figure 9A:
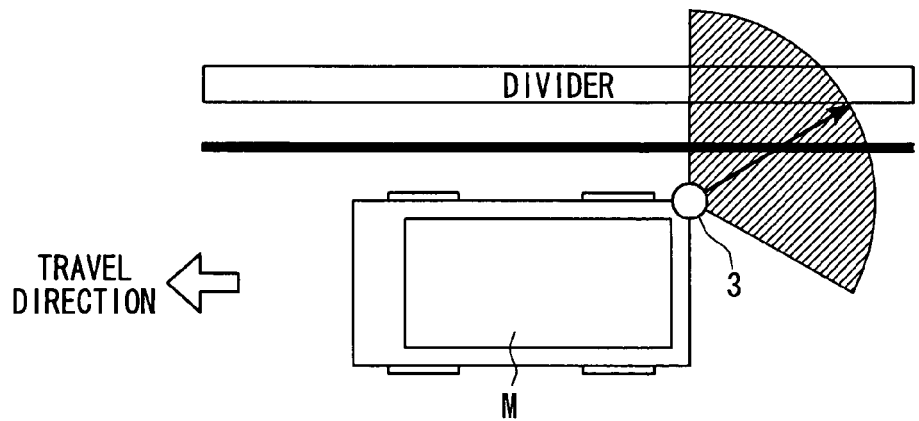
FIGS. 9A, 9B and 9C show illustrations of camera positions in other modifications of the embodiments.
Figure 9B:
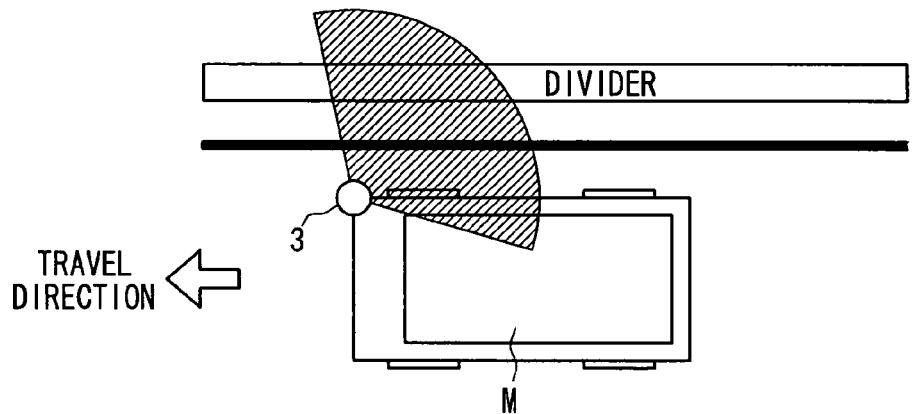

Furthermore, the second imaging unit 3 may be positioned on the right side of the vehicle M as shown in FIGS. 9A, 9B.

In this manner, the road marking on the right edge of the lane, road side objects such as the curbstones of the right of the road in the right side traffic, the center divider of the left side traffic or the like can be appropriately be extracted as the characteristic points $P_{A2}$ from the second camera image.

Figure 9C:
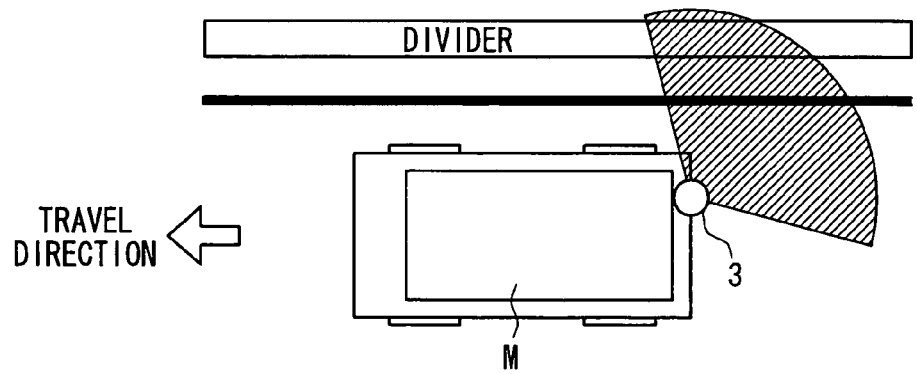

Furthermore, the second imaging unit 3 may be disposed at a rear end of the vehicle M as shown in FIG. 9C.

Figure 10A:
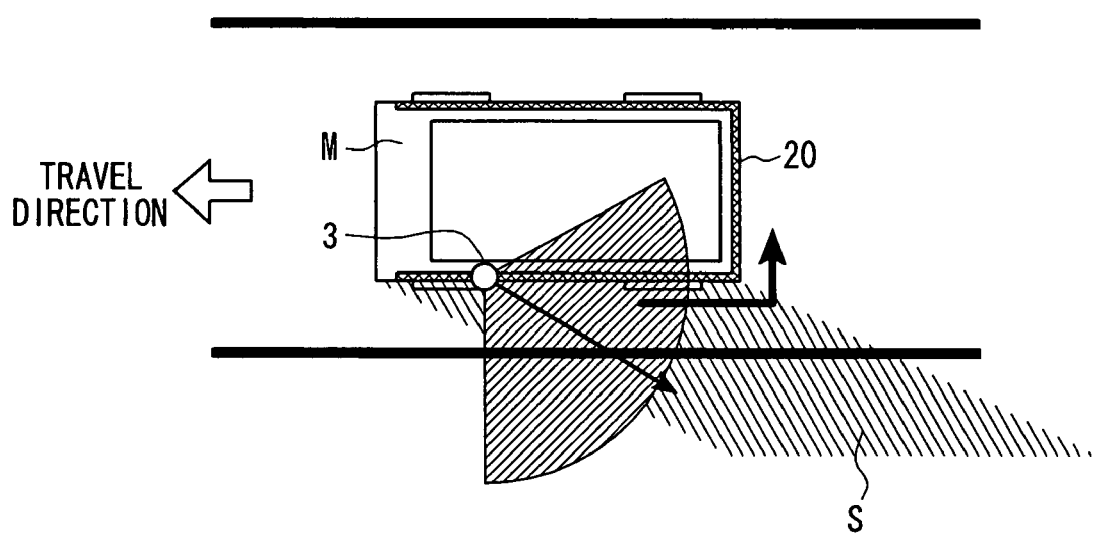
FIGS. 10A and 10B show illustrations of camera positions in yet other modifications of the embodiments.
Figure 10B:
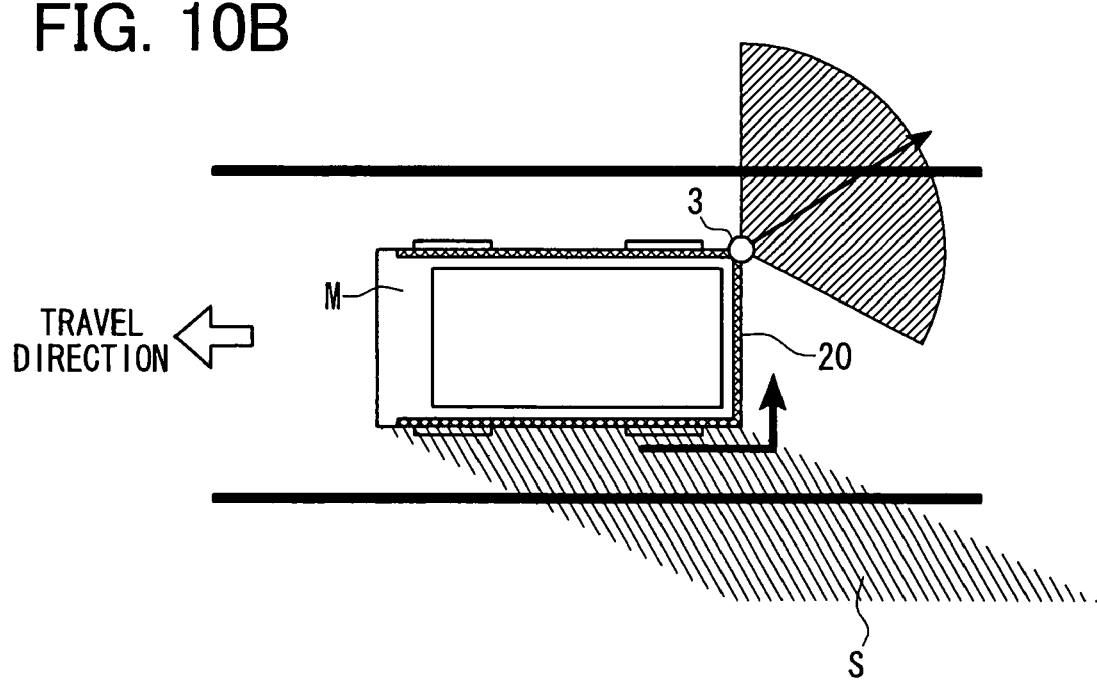

Furthermore, as shown in FIGS. 10A, 10B, the second imaging unit 3 may be disposed on railings 20 around the vehicle M. The railings 20 itself may be disposed on both sides and a rear side of the vehicle M. The second imaging unit 3 may be moved along the railings 20, and may be rotatably positioned in terms of the horizontal direction of the light axis.

In this case, an edge of the shadow S of the vehicle M (the subject vehicle) or other vehicles that run along the subject vehicle may be avoided from being captured in the camera image by appropriately controlling the position and the direction of the camera, thereby enabling a removal of the influence of the external light such as an erroneous recognition of the shadow edge as the characteristic point for an improved reliability.

Figure 11A:
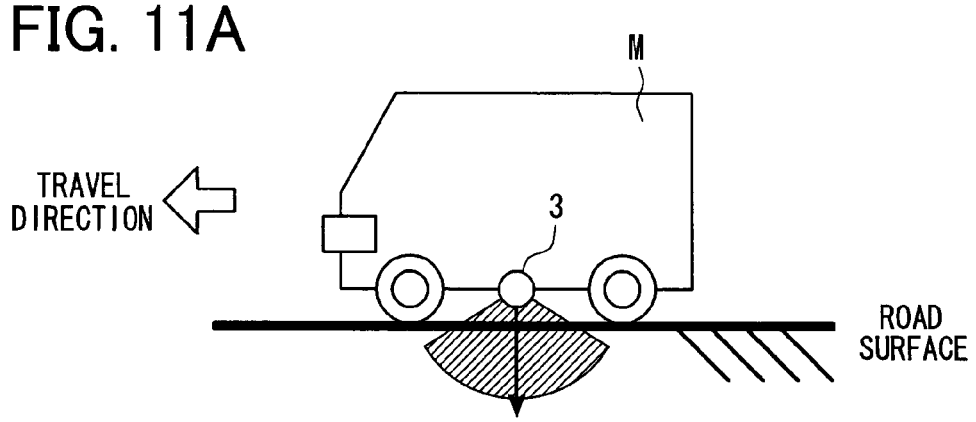
FIGS. 11A, 11B and 11C show illustrations of camera positions in still yet other modifications of the embodiments.
Figure 11B:
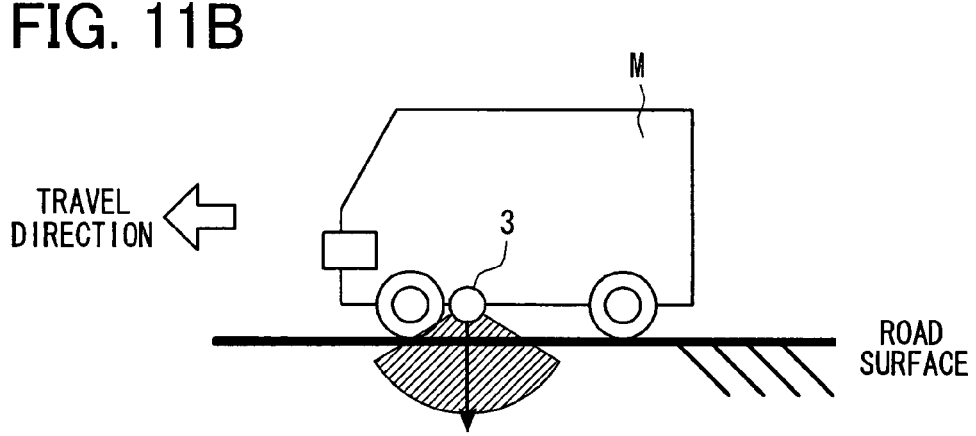
Figure 11C:
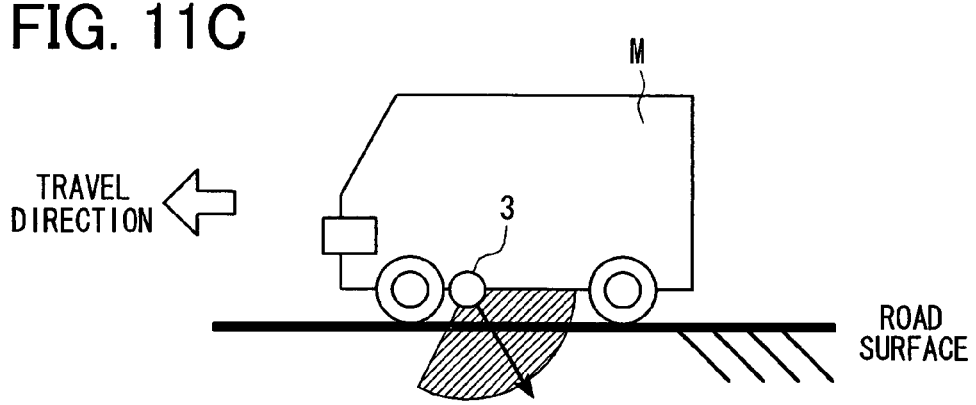
Figure 12:
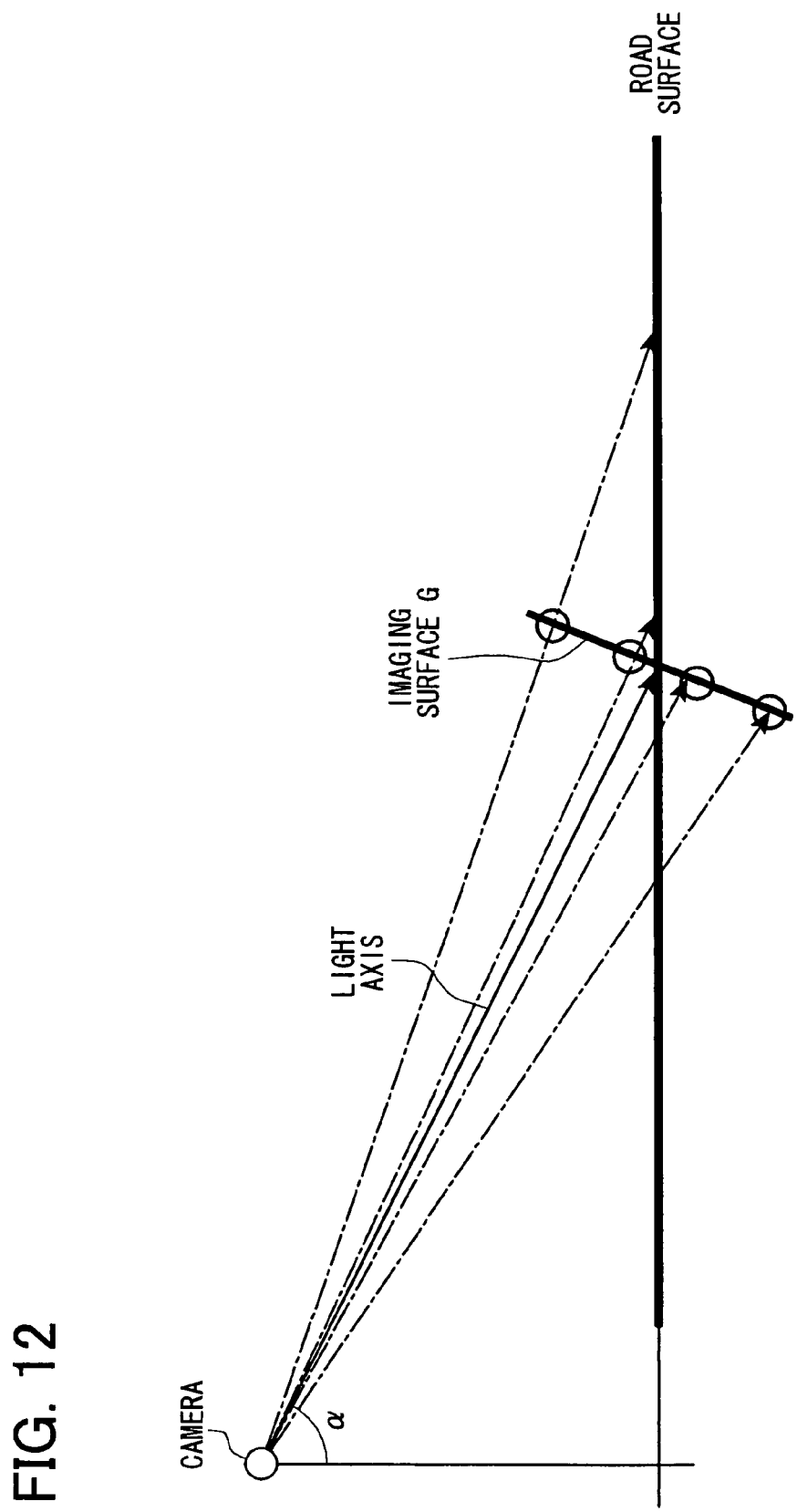
FIG. 12 shows an illustration of the camera position in a conventional field recognition apparatus.
Figure 13:
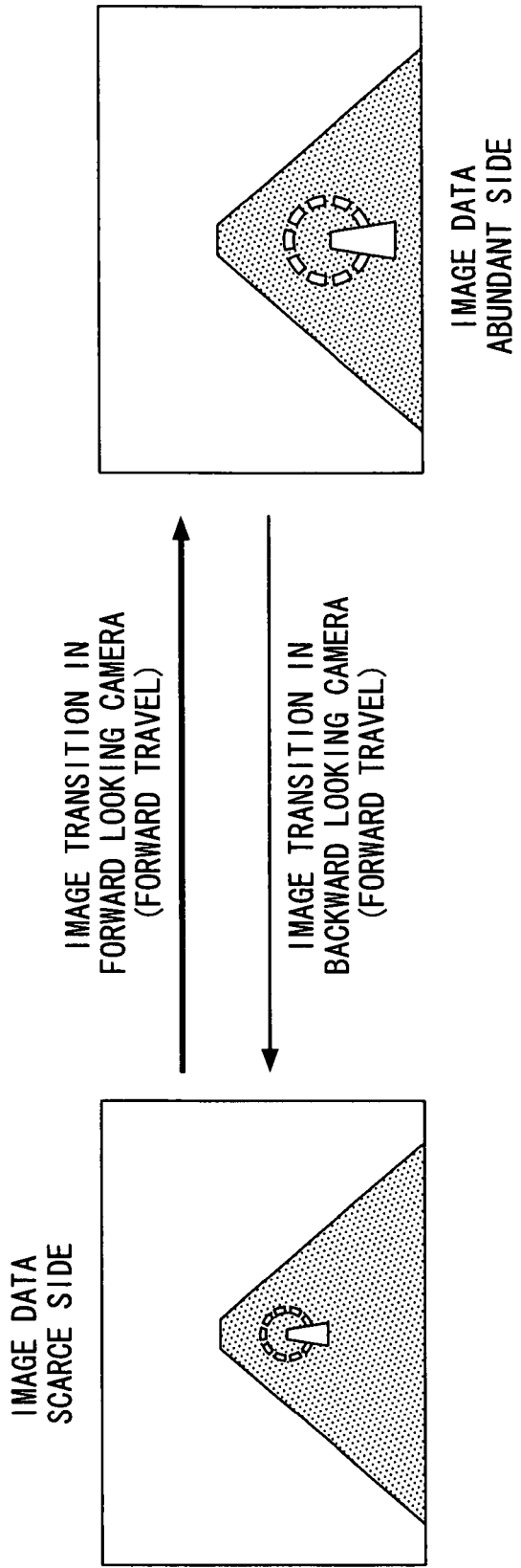
FIG. 13 shows an illustration of an image derived from a camera in the conventional filed recognition apparatus.

Furthermore, as shown in FIGS. 11A to 11C, the second imaging unit 3 may be disposed on a bottom surface of the vehicle M. In this case, the second imaging unit 3 may be preferably disposed at a center portion of the vehicle M for avoiding the shadow of the vehicle M to be captured in the image as shown in FIG. 11A, or may be preferably disposed in a front half of the vehicle M in consideration that the light axis of the second imaging unit 3 may be tilted toward the back of the vehicle M as shown in FIGS. 11B, 11C.

Furthermore, the light axis of the second imaging unit 3 may be tilted toward a front side of the vehicle M when the vehicle M travels backward.

Furthermore, the second imaging unit 3 may also be used as a backward travel monitor camera for imaging a dead angle of the driver at the back of the vehicle M.

Furthermore, the second imaging unit 3 may have a light for lighting an imaging area for removing the effect of the sun ray.

Furthermore, a color camera that generates pixels having chroma values may be used as the first imaging unit 2 and/or the second imaging unit 3. An infrared camera that generates pixels having infrared intensity values may also be used as the first/second imaging unit 2, 3. A vision chip for edge enhancement may also be used for generating the output image.

Furthermore, the movement parameter $K_B$ in the second camera coordinate system may directly be converted to the movement parameter $K_A$ in the first camera coordinate system without conversion to the movement parameter $K_C$ in the vehicle coordinate system.

Such changes and modifications are to be understood as being within the scope of the present invention as defined by the appended claims.

What is claimed is:

1. A field recognition apparatus for use in a movable body comprising:
a first imaging unit disposed on the movable body imaging a field in a proximity of the movable body;
a second imaging unit disposed on the movable body imaging a road surface that is traveled by the movable body, wherein the second imaging unit has a light axis pointing downward in comparison to the light axis of the first imaging unit;
a movement detection unit detecting an optical flow of a characteristic point on the road surface based on an image of the road surface derived from the second imaging unit, wherein the optical flow of the characteristic point is used to determine a movement parameter that specifies the movement of the movable body; and
an obstacle detection unit calculating three-dimensional data of a position and a shape of an obstacle based on the movement parameter derived from the movement detection unit and the image derived from the first imaging unit;
wherein the obstacle detection unit includes:
a division unit dividing the image derived from the first imaging unit into plural image pieces;
a divisional parameter calculation unit calculating a divisional parameter in each of the plural image pieces, wherein the divisional parameter specifies a position and an orientation of each of the plural image pieces in a three-dimensional field based on the optical flow of the characteristic point in each of the plural image pieces and the movement parameter derived from the movement detection unit; and
a mapping unit mapping each of the plural image pieces by using three-dimensional coordinates based on the divisional parameter derived from the divisional parameter calculation unit and the position of each of the plural image pieces in the image derived from the first imaging unit.

2. A field recognition apparatus for use in a movable body comprising:
a first imaging unit disposed on the movable body imaging a field in a proximity of the movable body;
a second imaging unit disposed on the movable body imaging a road surface that is traveled by the movable body, wherein the second imaging unit has a light axis pointing downward in comparison to the light axis of the first imaging unit;
a movement detection unit detecting an optical flow of a characteristic point on the road surface based on an image of the road surface derived from the second imaging unit, wherein the optical flow of the characteristic point is used to determine a movement parameter that specifies the movement of the movable body; and
an obstacle detection unit calculating three-dimensional data of a position and a shape of an obstacle based on the movement parameter derived from the movement detection unit and the image derived from the first imaging unit;
a division unit dividing an image derived from the first imaging unit into plural image pieces;
a movement correction unit correcting the movement parameter derived from the movement detection unit based on extraction of road pieces from the plural image pieces as the road surface that includes the optical flow of the characteristic point;

a divisional parameter calculation unit calculating a divisional parameter in each of the plural image pieces, wherein the divisional parameter specifies a position and an orientation of each of the plural image pieces in a three-dimensional field based on the optical flow of the characteristic point in each of the plural image pieces and the movement parameter derived from the movement detection unit; and a mapping unit mapping each of the plural image pieces by using three-dimensional coordinate based on the divisional parameter derived from the divisional parameter calculation unit and the position of each of the plural image pieces in the image derived from the first imaging unit.

3. The field recognition apparatus as in claim 1, wherein the first imaging unit is disposed to have the light axis aligned in one of a horizontal direction and a direction lower than the horizontal direction toward a front field of the movable body.

4. The field recognition apparatus as in claim 3, wherein the image derived from the first imaging unit has a landscape shape that has a greater length in a lateral direction.

5. The field recognition apparatus as in claim 1, wherein the second imaging unit has the light axis aligned in a vertically downward direction.

6. The field recognition apparatus as in claim 1, wherein the second imaging unit has the light axis tilted from a vertically downward direction toward a rear direction of the movable body.

7. The field recognition apparatus as in claim 1 further comprising:

a position control unit controlling a tilt angle of the second imaging unit toward a reverse direction of movable body movement to have a greater value in an occasion that a speed of the movable body movement increases so that two consecutive images derived from the second imaging unit have an identical characteristic point included therein.

8. The field recognition apparatus as in claim 5, wherein the image derived from the second imaging unit has a portrait shape that has a greater length in a longitudinal direction.

9. The field recognition apparatus as in claim 1, wherein the second imaging unit is so disposed in terms of an angle and a position as to image at least a left marker on the road surface that shows a left edge of a lane, or one of a road side object that is disposed on a roadside of a left side traffic and a median at a center of a road in a right side traffic.

10. The field recognition apparatus as in claim 1, wherein the second imaging unit is so disposed in terms of an angle and a position as to image at least a right marker on the road surface that shows a right edge of a lane, or one of a road side object that is disposed on a roadside of a right side traffic and a median at a center of a road in a left side traffic.

11. The field recognition apparatus as in claim 1, wherein the second imaging unit is disposed at a rear side of the movable body, and the second imaging unit additionally serves as a rear view camera for monitoring a dead angle of a driver.

12. The field recognition apparatus as in claim 1, wherein the second imaging unit is disposed on a bottom surface of the movable body.

13. The field recognition apparatus as in claim 12, wherein the second imaging unit is disposed on a front portion of the movable body relative to a center of the movable body.

14. The field recognition apparatus as in claim 1 further comprising:

a position control unit controlling an angle and a position of the second imaging unit so that the image derived from the second imaging unit is prevented from including a shadow of a subject movable body, a shadow of another movable body that travels along the subject movable body, or a shadow of a roadside object.

15. The field recognition apparatus as in claim 1 further comprising:

an illumination unit illuminating an imaging area of the second imaging unit.

16. The field recognition apparatus as in claim 1, wherein at least one of the first imaging unit and the second imaging unit generates the image having a luminous intensity value for respective pixels.

17. The field recognition apparatus as in claim 1, wherein at least one of the first imaging unit and the second imaging unit generates the image having a chroma value for respective pixels.

18. The field recognition apparatus as in claim 1, wherein at least one of the first imaging unit and the second imaging unit generates the image having an infrared ray intensity value for respective pixels.

19. The field recognition apparatus as in claim 1, wherein at least one of the first imaging unit and the second imaging unit generates the image having an edge emphasis.

20. A field recognition method used in a field recognition apparatus for recognizing an obstacle in a proximity of a movable body in terms of a position and a shape in a three-dimensional space based on images derived from a first imaging unit of the field recognition apparatus for imaging a field in the proximity of the .movable body and a second imaging unit of the field recognition apparatus with a light axis aligned downward relative to the light axis of the first imaging unit for imaging a road surface that is traveled by the movable body, the method comprising:

detecting an optical flow of a characteristic point on the road surface based on the image of the road surface derived from the second imaging unit, wherein the optical flow of the characteristic point is used to determine a movement parameter that specifies the movement of the movable body; and calculating three-dimensional data of the position and the shape of the obstacle based on the movement parameter derived from a preceding step and the image derived from the first imaging unit; wherein calculating the three-dimensional data of the position and the shape of the obstacle further includes:

dividing the image derived from the first imaging unit into plural image pieces;

calculating a divisional parameter in each of the plural image pieces, wherein the divisional parameter specifies a position and an orientation of each of the plural image pieces in a three-dimensional field based on the optical flow of the characteristic point in each of the plural image pieces and the movement parameter derived from the movement detection in a preceding procedure; and mapping each of the plural image pieces by using three-dimensional coordinates based on the divisional parameter derived from the divisional parameter calculated in a preceding procedure and the position of each of the plural image pieces in the image derived from the first imaging unit.

21. A field recognition method used in a field recognition apparatus for recognizing an obstacle in a proximity of a movable body in terms of a position and a shape in a three-dimensional space based on images derived from a first imaging unit of the field recognition apparatus for imaging a field in the proximity of the movable body and a second imaging unit of the field recognition apparatus with a light axis aligned downward relative to the light axis of the first imaging unit for imaging a road surface that is traveled by the movable body, the method comprising:

detecting an optical flow of a characteristic point on the road surface based on the image of the road surface derived from the second imaging unit, wherein the optical flow of the characteristic point is used to determine a movement parameter that specifies the movement of the movable body; and calculating three-dimensional data of the position and the shape of the obstacle based on the movement parameter derived from a preceding step and the image derived from the first imaging unit; wherein calculating the three-dimensional data of the position and the shape of the obstacle further includes:

dividing the image derived from the first imaging unit into plural image pieces;

correcting the movement parameter derived from the movement detection in a preceding step based on extraction of road pieces from the plural image pieces as the road surface that includes the optical flow of the characteristic point;

calculating a divisional parameter in each of the plural image pieces, wherein the divisional parameter specifies a position and an orientation of each of the plural image pieces in a three-dimensional field based on the optical flow of the characteristic point in each of the plural image pieces and the movement parameter derived from the movement detection in a preceding procedure; and mapping each of the plural image pieces by using three-dimensional coordinates based on the divisional parameter derived from the divisional parameter calculated in a preceding procedure and the position of each of the plural image pieces in the image derived from the first imaging unit.

22. A program recorded on a non-transitory computer-readable medium for a procedure of field recognition by a computer, the program for use in a movable body comprising:

providing a first imaging unit and a second imaging unit;

detecting an optical flow of a characteristic point on a road surface based on an image of the road surface derived from a second imaging unit, wherein the optical flow of the characteristic point is used to determine a movement parameter that specifies the movement of the movable body; and calculating three-dimensional data of a position and a shape of the obstacle based on the movement parameter derived from the movement detection in a preceding step and an image derived from a first imaging unit, wherein the first imaging unit and the second imaging unit are provided on the movable body, the first imaging unit images a field in the proximity of the movable body, and the second imaging unit with a light axis aligned downward relative to the light axis of the first imaging unit for imaging a road surface that is traveled by the movable body;

wherein the step of calculating the three-dimensional data of the position and the shape of the obstacle further includes:

dividing the image derived from the first imaging unit into plural image pieces;

calculating a divisional parameter in each of the plural image pieces, wherein the divisional parameter specifies a position and an orientation of each of the plural image pieces in a three-dimensional field based on the optical flow of the characteristic point in each of the plural image pieces and the movement parameter derived from the movement detection in a preceding procedure; and mapping each of the plural image pieces by using three-dimensional coordinates based on the divisional parameter derived from the divisional parameter calculated in a preceding procedure and the position of each of the plural image pieces in the image derived from the first imaging unit.

23. A program recorded on a non-transitory computer-readable medium for a procedure of field recognition by a computer, the program for use in a movable body comprising:

providing a first imaging unit and a second imaging unit;

detecting an optical flow of a characteristic point on a road surface based on an image of the road surface derived from a second imaging unit, wherein the optical flow of the characteristic point is used to determine a movement parameter that specifies the movement of the movable body; and calculating three-dimensional data of a position and a shape of the obstacle based on the movement parameter derived from the movement detection in a preceding step and an image derived from a first imaging unit, wherein the first imaging unit and the second imaging unit are provided on the movable body, the first imaging unit images a field in the proximity of the movable body, and the second imaging unit with a light axis aligned downward relative to the light axis of the first imaging unit for imaging a road surface that is traveled by the movable body;

wherein the step of calculating the three-dimensional data of the position and the shape of the obstacle further includes:

dividing the image derived from the first imaging unit into plural image pieces;

correcting the movement parameter derived from the movement detection in a preceding step based on extraction of road pieces from the plural image pieces as the road surface that includes the optical flow of the characteristic point;

calculating a divisional parameter in each of the plural image pieces, wherein the divisional parameter specifies a position and an orientation of each of the plural image pieces in a three-dimensional field based on the optical flow of the characteristic point in each of the plural image pieces and the movement parameter derived from the movement detection in a preceding procedure; and mapping each of the plural image pieces by using three-dimensional coordinates based on the divisional parameter derived from the divisional parameter calculated in a preceding procedure and the position of each of the plural image pieces in the image derived from the first imaging unit.

24. The field recognition apparatus as in claim 6,
wherein the image derived from the second imaging unit has a portrait shape that has a greater length in a longitudinal direction.

25. The field recognition apparatus as in claim 7,
wherein the image derived from the second imaging unit has a portrait shape that has a greater length in a longitudinal direction.

26. The field recognition apparatus as in claim 2,
wherein the first imaging unit is disposed to have the light axis aligned in one of a horizontal direction and a direction lower than the horizontal direction toward a front field of the movable body.

27. The field recognition apparatus as in claim 26,
wherein the image derived from the first imaging unit has a landscape shape that has a greater length in a lateral direction.

28. The field recognition apparatus as in claim 2,
wherein the second imaging unit has the light axis aligned in a vertically downward direction.

29. The field recognition apparatus as in claim 28,
wherein the image derived from the second imaging unit has a portrait shape that has a greater length in a longitudinal direction.

30. The field recognition apparatus as in claim 2,
wherein the second imaging unit has the light axis tilted from a vertically downward direction toward a rear direction of the movable body.

31. The field recognition apparatus as in claim 30,
wherein the image derived from the second imaging unit has a portrait shape that has a greater length in a longitudinal direction.

32. The field recognition apparatus as in claim 2 further comprising:
a position control unit controlling a tilt angle of the second imaging unit toward a reverse direction of movable body movement to have a greater value in an occasion that a speed of the movable body movement increases so that two consecutive images derived from the second imaging unit have an identical characteristic point included therein.

33. The field recognition apparatus as in claim 32,
wherein the image derived from the second imaging unit has a portrait shape that has a greater length in a longitudinal direction.

34. The field recognition apparatus as in claim 2,
wherein the second imaging unit is so disposed in terms of an angle and a position as to image at least a left marker on the road surface that shows a left edge of a lane, or one of a road side object that is disposed on a roadside of a left side traffic and a median at a center of a road in a right side traffic.

35. The field recognition apparatus as in claim 2,
wherein the second imaging unit is so disposed in terms of an angle and a position as to image at least a right marker on the road surface that shows a right edge of a lane, or one of a road side object that is disposed on a roadside of a right side traffic and a median at a center of a road in a left side traffic.

36. The field recognition apparatus as in claim 2,
wherein the second imaging unit is disposed at a rear side of the movable body, and
the second imaging unit additionally serves as a rear view camera for monitoring a dead angle of a driver.

37. The field recognition apparatus as in claim 2,
wherein the second imaging unit is disposed on a bottom surface of the movable body.

38. The field recognition apparatus as in claim 37,
wherein the second imaging unit is disposed on a front portion of the movable body relative to a center of the movable body.

39. The field recognition apparatus as in claim 2 further comprising:
a position control unit controlling an angle and a position of the second imaging unit so that the image derived from the second imaging unit is prevented from including a shadow of a subject movable body, a shadow of another movable body that travels along the subject movable body, or a shadow of a roadside object.

40. The field recognition apparatus as in claim 2 further comprising:
an illumination unit illuminating an imaging area of the second imaging unit.

41. The field recognition apparatus as in claim 2,
wherein at least one of the first imaging unit and the second imaging unit generates the image having a luminous intensity value for respective pixels.

42. The field recognition apparatus as in claim 2,
wherein at least one of the first imaging unit and the second imaging unit generates the image having a chroma value for respective pixels.

43. The field recognition apparatus as in claim 2,
wherein at least one of the first imaging unit and the second imaging unit generates the image having an infrared ray intensity value for respective pixels.

44. The field recognition apparatus as in claim 2,
wherein at least one of the first imaging unit and the second imaging unit generates the image having an edge emphasis.

* * * * *